United States Patent [19]

Acker

[11] 4,231,767
[45] Nov. 4, 1980

[54] LIQUID-GAS SEPARATOR APPARATUS

[75] Inventor: Roy M. Acker, Los Angeles, Calif.

[73] Assignee: TRW Inc., Cleveland, Ohio

[21] Appl. No.: 953,598

[22] Filed: Oct. 23, 1978

[51] Int. Cl.³ .............................................. B01D 19/00
[52] U.S. Cl. ...................................... 55/186; 55/521; 166/105.5
[58] Field of Search ................ 55/159, 160, 210, 213, 55/314, 521, 525, 185–188; 166/105.5, 105.6, 205, 230; 210/120, 130, 131

[56] References Cited

U.S. PATENT DOCUMENTS

| | | | |
|---|---|---|---|
| 1,572,333 | 2/1926 | Taylor | 166/105.6 |
| 1,578,720 | 3/1926 | Derby | 166/105.5 |
| 1,611,206 | 12/1926 | Larc | 166/205 |
| 1,915,136 | 6/1933 | Share | 166/230 |
| 2,096,484 | 10/1937 | Farmer | 55/159 |
| 2,104,339 | 1/1938 | Arutunoff | 166/105.5 X |
| 2,823,760 | 2/1958 | Andersen | 55/313 |
| 2,877,852 | 3/1959 | Bashara | 166/230 X |
| 3,386,230 | 6/1968 | Riesberg et al. | 55/337 |
| 3,394,533 | 7/1968 | Li et al. | 55/337 |
| 3,413,778 | 12/1968 | Lavery et al. | 55/186 |
| 3,448,862 | 6/1969 | Kudlaty | 210/489 |
| 3,492,793 | 2/1970 | Bhuta et al. | 55/159 |
| 3,664,093 | 5/1972 | Murdock | 55/174 |
| 3,881,870 | 5/1975 | Hatfield | 55/521 X |
| 3,892,547 | 7/1975 | Tucker | 55/178 |
| 3,893,925 | 7/1975 | Jones | 210/166 |
| 3,933,448 | 1/1976 | Di Peri | 55/159 |
| 4,050,237 | 9/1977 | Salz et al. | 55/486 X |

Primary Examiner—John Adee
Attorney, Agent, or Firm—Shapiro and Shapiro

[57] ABSTRACT

A downhole liquid-gas separator for use with a submergible pump employs an inverted conical, convoluted, fine-mesh screen in a tubular housing. The convolutions form grooves extending upwardly along the screen. A liquid-gas mixture enters the housing near the lower, apex end of the screen. The screen mesh size is selected so that liquid is pumped through the screen and continues to flow upwardly through the housing, while gas bubbles rise along the exterior of the screen and are vented from the housing. The gas bubbles channel into the troughs of the screen grooves, leaving the peak regions of the convolutions free for the passage of liquid. A relief valve arrangement bypasses the screen when it becomes clogged, and permits the liquid-gas mixture to flow upwardly through the housing.

9 Claims, 4 Drawing Figures

LIQUID-GAS SEPARATOR APPARATUS

BACKGROUND OF THE INVENTION

This invention relates to liquid-gas separators and more particularly to downhole liquid-gas separators used in conjunction with submergible pumps.

Liquid-gas separators are used downhole in oil-producing wells to separate gas from crude oil before the oil enters the downhole pump. See, for example, U.S. Pat. Nos. 2,104,339 and 2,969,742, both assigned to the same assignee as the present invention. Any gas present in the oil supplied to the pump tends to reduce the volumetric efficiency of the pump. Thus an effective liquid-gas separator enables the pumping of more oil. The present invention is directed to an improved liquid-gas separator and employs a unique fine mesh screen structure to provide better separation of gas from liquid than has been possible with comparable separators known heretofore.

The prior art is replete with separators or filters employing screens or other porous structures. U.S. Pat. No. 3,933,448 discloses a device employing a convoluted screen partition which passes liquid, but not gas. U.S. Pat. No. 3,394,533 discloses a device employing a conical screen (with its axis horizontal) which passes gas but not liquid. U.S. Pat. No. 3,893,925 discloses a device employing an upright perforated fluted conical structure for separating oil from water. See also U.S. Pat. Nos. 4,050,237; 3,386,230; 3,413,778; 3,492,793; 2,823,760; 3,664,093; 3,892,547; 1,711,779; 3,448,862; 621,998; 1,071,328; 2,096,484; 2,170,074; 2,191,052; 2,717,148; 2,749,265; and 3,159,310. Despite the proliferation of prior art, a need has remained for a superior device for separating liquid such as crude oil from gas in a downhole environment.

BRIEF DESCRIPTION OF THE INVENTION

Briefly stated, a preferred embodiment of the present invention employs an inverted conical, convoluted, fine-mesh screen to separate gas from liquid. The screen passes the liquid but not the gas. Gas bubbles channel into the troughs of upwardly extending screen grooves, leaving peak regions of the convolutions free for the passage of liquid. The screen may be bypassed automatically if it becomes blocked.

BRIEF DESCRIPTION OF THE DRAWINGS

The invention will be further described in conjunction with the accompanying drawings, which illustrate a preferred and exemplary embodiment, and wherein.

DETAILED DESCRIPTION OF THE PREFERRED EMBODIMENT

Figure 1:
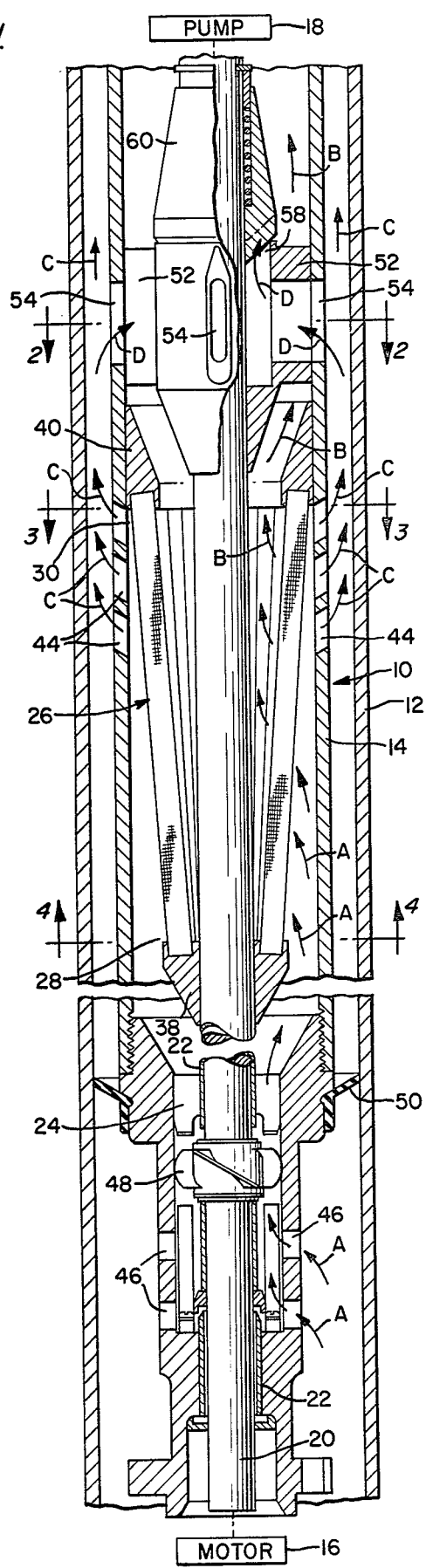
FIG. 1 is a contracted longitudinal sectional view illustrating the apparatus of the invention installed in a well.
Figure 2:
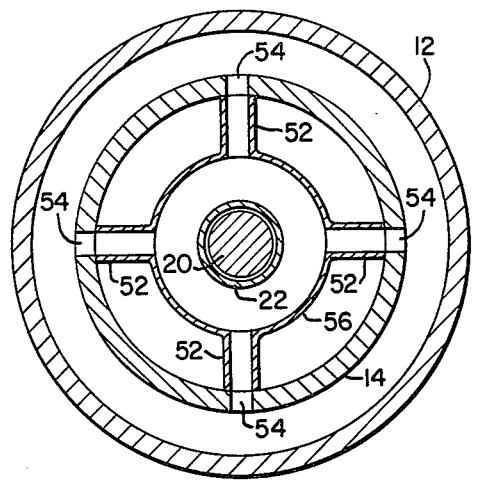
FIGS. 2, 3 and 4 are transverse sectional views taken along lines 2—2, 3—3, and 4—4, respectively.
Figure 3:
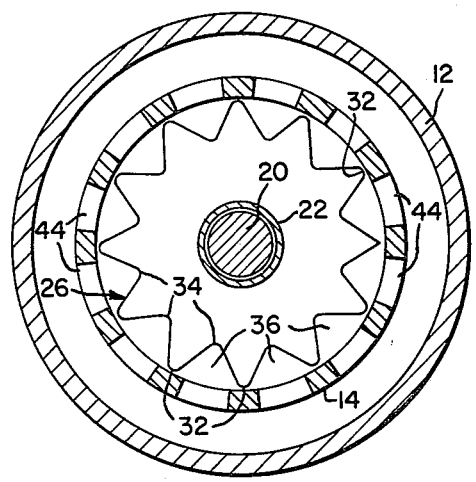
Figure 4:
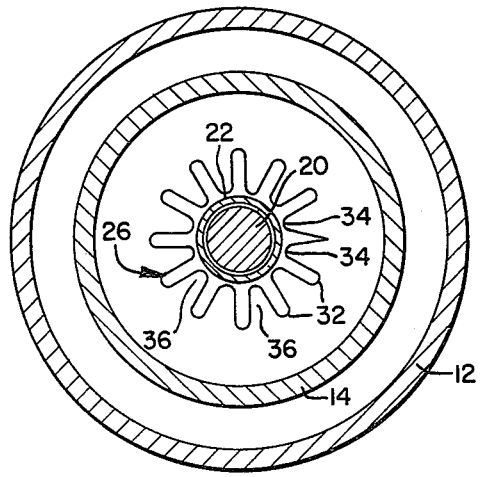

FIG. 1 illustrates liquid-gas separator apparatus 10 of the invention installed downhole in a well, the cylindrical casing of which is shown at 12. The apparatus of the invention comprises a tubular (preferably cylindrical) housing 14 extending longitudinally within and spaced from the well casing 12. In the embodiment illustrated, the lower end of the housing 14 is connected to the housing of an electric motor 16 (shown diagrammatically), and the upper end of housing 14 is connected to the housing of a submergible pump 18 (shown diagrammatically). An appropriate motor and pump unit (including a protector which may be interposed between the motor and the separator) is disclosed in U.S. Pat. No. 2,270,666, assigned to the same assignee as the present invention. A drive shaft 20 extends from the motor to the pump along the axis of housing 14. Shaft 20 may be supported in the housing by means of sleeves 22 mounted on end walls of the housing and mounted intermediate the end walls by spiders 24.

The invention employs a liquid-gas separator screen 26 forming an inverted generally conical structure that tapers from a lower, apex end 28 to an upper, base end 30. The screen is convoluted or fluted to provide successive peaks 32 and troughs 34 defining grooves 36 extending upwardly along the conical screen. Lower end 28 of the screen may be embedded in a support 38 mounted on a sleeve 22, while the upper end 30 of the screen may be embedded in a support 40 sealed to the sidewall of housing 14. Supports 38 and 40 may comprise conventional potting material, for example. Gas vents 44 are provided through the side-wall of housing 14 just upstream of the upper end 30 of screen 26. Inlets 46 are provided at the lower end of the housing to permit ambient well fluid, which will be referred to as a liquid-gas mixture, to enter the housing 14. An inducer 48, such as an impeller mounted on shaft 20 downstream of inlets 46, is preferably employed to add to the net positive suction head and thereby limit the amount of cavitation at the main pump 18. A barrier 50 is preferably provided to seal the space between the housing 14 and the casing 12 at the lower end of the housing, so that the liquid-gas mixture in the casing is constrained to enter inlets 46.

A bypass arrangement is provided to permit the liquid-gas mixture to flow through the housing 14 in the event that the screen becomes clogged or blocked. In the form shown the bypass arrangement comprises a cruciform spider structure downstream of screen 26 and including hollow arms 52 providing ducts which extend from inlet ports 54 through the sidewall of housing 14 to a central chamber 56 in the housing. The upper end of chamber 56 has an outlet opening 58 that is normally closed by a relief valve 60, such as a conventional spring-biased poppet.

The invention operates generally in the following manner. The liquid-gas mixture enters the housing 14 and approaches the screen 26 as indicated by arrows A. Liquid passes through the screen and flows upwardly through the housing 14 as indicated by arrows B, past the arms 52 of the cruciform structure to the inlet of pump 18. The gas bubbles pass upwardly along the exterior of screen 26, exit from the housing 14 via vents 44, and move upwardly in the space between housing 14 and casing 12, as indicated by arrows C. If the screen becomes overloaded with solid particles, that is, blocked or clogged, the pressure differential on the relief valve 60, such as 2–5 psi, will be sufficient to open the valve, permitting the liquid-gas mixture to bypass the screen and flow along the exterior of the screen, out of vents 44, through the hollow arms 52 of the cruciform structure, and out of opening 58 of the central chamber 56 and through housing 14 to the pump, as indicated by arrows D. By providing a suitable reverse flow arrangement, as, for example, in U.S. Pat. No. 3,807,894, assigned to the same assignee as the present invention, the screen may be flushed when the pump is shut down, so that the relief valve may then shut again and the screen may again function as a liquid-gas separator.

The liquid-gas separator of the invention operates upon the principle that gas bubbles are inhibited from passing through a fine mesh screen by the surface tension effects of the liquid, but the liquid passes through the screen. Gas bubbles which collect on the screen surface merge to form bubbles which have sufficient buoyancy to overcome the surface tension force and which float upwards and out of the separator into the space between the housing 14 and the well casing 12, and then to the surface. Screens can be purchased with a desired bubble point rating, which is the differential pressure across the screen at which bubbles break free of the surface tension and gas penetrates the screen (for a standard test liquid). The greatest resistance to bubble penetration would be provided by the finest mesh screens. Unfortunately, the finest mesh screens also have the greatest resistance to liquid flow through the screen, and the liquid must penetrate the screen to be separated from the gas. Moreover, screen choice cannot be made entirely on the basis of the ratio of bubble point pressure to flow resistance factor, because there are other sources of pressure differential acting on the screen which must be considered. For example, there may be places on the screen where the pressure differs by an amount equal to the velocity head because of the stagnant fluid on one side and the moving fluid on the other. Vibration of the separator can also cause pressure differential across the screen. Thus the optimum screen is a weighted choice, considering the various conflicting factors.

The screen preferably employed in the present invention to separate gas and crude oil is a square mesh stainless steel screen having 230 0.0014 inch diameter wires per inch with a mesh opening of 0.0029 inch and 46% open area. To assist the fine mesh screen 26 in withstanding the applied pressure, a heavier screen (not shown), such as a square mesh screen with 14 0.009-inch diameter wires per inch, may be employed to back up the fine mesh screen. It may be desirable to weld or braze the exposed screen edges to a 0.25-inch wide strip of stainless steel shim stock, for example, to prevent unraveling of the screen material. The fine mesh screen 26 may have an area of about 128 sq. in. and a length of about 9 inches with grooves 36 about ½ inch in depth at the apex end and with successive troughs 34 circumferentially spaced by 30° at the apex end. Such a screen has the capability of allowing a flow of 4.67 GPM/sq. in., which is far in excess of the 0.312 GPM/sq. in. theoretically required for a pump flow of 40 GPM.

Bubbles attached to the screen and sand particles embedded in the screen reduce the available flow area and increase the pressure drop due to the flow. The effect of sand will be cumulative, so that a large amount of excess area is desirable. Bubbles floating upward near the screen tend to be driven into the screen by the liquid flow, increasing the screen area which is restricted. The screen may also be damaged in a manner which opens up some pores, allowing gas to flow through the screen at less than the bubble point pressure. An excess of screen area minimizes the pressure differential and makes less likely the passage of gas through the screen.

Bubbles blockage of the screen is a significant problem in providing a satisfactory liquid-gas separator. As bubbles flow upwardly past the screen, the bubbles have a vertical velocity equal to the liquid velocity plus the bubble rise velocity. As liquid flows through the screen, the velocity of the remaining liquid is slowed, thereby reducing the bubble velocity. With the same volume of bubbles, a greater cross-sectional area is required for the bubbles.

The convoluted, inverted conical screen employed in the invention performs synergistically to solve this problem. The convolutions provide increased screen area, of course, and the effective area of the screen increases as fluid flows upwardly toward the base of the screen. Moreover, the upward movement of the bubbles is directed along the grooves 36 and the bubbles channel into the troughs 34 of the upwardly extending grooves by virtue of the slope of the inverted conical surface, leaving the convex portions at the peaks of the screen folds open for liquid passage. The convoluted screen thus not only provides additional surface area but also provides a structure in which bubble blockage of the screen is reduced. In comparison, a simple conical screen without convolutions would separate gas, but would become saturated and pass gas at a lower percentage of gas than the convoluted inverted conical screen of the invention.

One design concern is the radius of the concave troughs of the convolutions. It is preferred that this radius be made greater than the effective radius of the breakaway bubble. Otherwise, the surface tension forces on the bubble may be augmented by the greater effective perimeter enveloping the bubble and cause the bubble to grow to a larger diameter before breaking away. It has been determined that the larger bubbles are not spherical and have a higher drag coefficient than that for the equivalent sphere, which results in a slower rise velocity, increased bubble blockage of the screen and a greater required area. For crude oil, a bubble size between 0.127 and 0.180 inch diameter at breakaway is indicated. The radius of the concave trough portions of the convolutions of the screen should preferably be at least half of these values. In practice, a radius of 0.09 inch appears to be satisfactory. The same radius may be used for the convex peaks of the convolutions.

While a preferred embodiment of the invention has been shown and described, it will be apparent to those skilled in the art that changes can be made in this embodiment without departing from the principles and spirit of the invention, the scope of which is defined in the appended claims.

I claim:

1. Liquid-gas separator apparatus comprising a tubular housing adapted to be placed upright in a well, an inverted generally conical, convoluted screen in said housing with its axis extending longitudinally of the housing, the screen convolutions having successive peaks and troughs defining grooves extending along the screen from a lower, apex region of the screen to an upper, base region of the screen, the apex region of the screen being spaced from a sidewall of the housing and the base region of the screen being sealed to the sidewall of the housing, inlet means for directing a liquid-gas mixture into the housing near the apex region of the screen and for constraining the mixture to pass upwardly along the exterior of the screen, and vent means near the base region of the screen for venting gas from the housing, the mesh size of the screen being predetermined so that liquid passes through the screen and gas passes along the exterior of the screen, especially in the grooves, and is vented through the vent means.

2. Apparatus in accordance with claim 1, wherein the housing is within and spaced from a tubular well casing and the vent means provides a flow path from within the housing to the space between the housing and the casing.

3. Apparatus in accordance with claim 2, further comprising barrier means between the housing and the casing downstream of the inlet means so that the liquid-gas mixture is constrained to enter the inlet means.

4. Apparatus in accordance with claim 1, further comprising means in the housing for inducing a flow of the liquid-gas mixture toward the apex region of the screen.

5. Apparatus in accordance with claim 1, wherein a downstream end of the housing is connected to the inlet of a pump for pumping liquid through the housing.

6. Apparatus in accordance with claim 5, wherein an upstream end of the housing is connected to a motor, and a shaft for driving the pump extends from the motor through the housing to the pump.

7. Apparatus in accordance with claim 1, further comprising bypass means including duct means downstream of the screen for admitting fluid from the exterior of said housing to a chamber in the housing, the chamber having an outlet to the housing downstream of the screen, and pressure relief valve means for closing said outlet until a predetermined pressure differential exists across said valve means when the screen becomes clogged.

8. Apparatus in accordance with claim 7, wherein said duct means comprises a spider structure having a plurality of hollow arms extending inwardly of the housing to said chamber from inlet ports through the housing wall.

9. Liquid-gas separator apparatus comprising a housing having an upwardly extending wall, a convoluted screen in said housing having an interior surface and an exterior surface, the exterior surface facing said wall, said screen having a lower end spaced from said wall, said screen extending upwardly and outwardly from said lower end toward said wall and having an upper end sealed to said wall, the housing having a liquid flow path which extends upwardly from the interior surface of said screen, the screen convolutions having successive peaks and troughs defining grooves extending upwardly along the screen from the lower end of the screen to the upper end of the screen, inlet means near the lower end of the screen for directing a liquid-gas mixture into the space between said screen and said wall and for constraining said mixture to flow upwardly along the exterior surface of the screen, and vent means near the upper end of the screen for venting gas from the space between the screen and said wall, the mesh size of the screen being predetermined so that liquid passes through the screen and gas passes along the exterior surface of the screen, especially in the grooves, and is vented through the vent means.

* * * * *